United States Patent [19]

Murai et al.

[11] 4,243,718

[45] Jan. 6, 1981

[54] PRIMER COMPOSITIONS FOR SI-H-OLEFIN PLATINUM CATALYZED SILICONE COMPOSITIONS

[75] Inventors: Bunjiro Murai; Yasuji Matsumoto, both of Ohta, Japan

[73] Assignee: Toshiba Silicone Co. Ltd., Tokyo, Japan

[21] Appl. No.: 963,490

[22] Filed: Nov. 24, 1978

[51] Int. Cl.$^2$ .............................................. B32B 9/04
[52] U.S. Cl. ................................ 428/411; 156/307.5; 260/31.2 R; 156/329; 156/334; 428/391; 428/429; 428/447; 428/450; 428/451; 428/475.8; 428/480; 427/387; 427/410; 427/407.2; 427/412.1
[58] Field of Search ........ 428/447, 411, 413, 414–416, 428/429, 450, 451, 480, 475.8, 391; 525/100; 260/31.2 R; 156/306, 308, 329, 334; 427/387, 407 C, 407 A, 410

[56] References Cited

U.S. PATENT DOCUMENTS

| | | | |
|---|---|---|---|
| 3,317,369 | 5/1967 | Clark | 428/447 |
| 3,318,717 | 5/1967 | Simpson | 106/287.15 |
| 3,627,851 | 12/1971 | Brady | 428/447 |
| 3,667,993 | 6/1972 | Stevenson | 428/447 |
| 3,922,443 | 11/1975 | Brown | 428/447 |
| 3,971,884 | 7/1976 | Meeks | 106/287.13 |
| 4,048,356 | 9/1977 | Bakos | 428/447 |
| 4,049,867 | 9/1977 | Ito | 428/447 |
| 4,087,585 | 5/1978 | Schulz | 428/447 |
| 4,130,707 | 12/1978 | Leiser | 428/447 |

*Primary Examiner*—Ellis P. Robinson
*Attorney, Agent, or Firm*—John L. Young; E. Philip Koltos; Michael J. Doyle

[57] ABSTRACT

A primer composition for an Si-H-olefin platinum catalyzed composition comprising an epoxy functional silane, an alkenyl-group-containing organosilicon compound, a vinyl acetate type of polymer, platinum, and an ester type of organic solvent.

19 Claims, No Drawings

PRIMER COMPOSITIONS FOR SI-H-OLEFIN PLATINUM CATALYZED SILICONE COMPOSITIONS

BACKGROUND OF THE INVENTION

This invention pertains to a primer composition for adhering the silicone rubber, especially the so-called addition-type silicone rubber that cures by the reaction of the vinyl group directly bonded to the silicon atom with the $\equiv$Si—H linkage, with plastics, metals, and especially polyvinylchloride resin.

This addition-type silicone rubber is composed of polyorganosiloxane holding at least two vinyl groups in a molecule, polyorganosiloxane holding at least two $\equiv$Si—H bonds in a molecule and platinum catalyst. It is cured by addition reaction of vinyl groups and Si—H bonds at a temperature from room temperature to approximately 200° C. This kind of silicone rubber is usually cured at 100° C. to 150° C. for a few minutes. Therefore, it is widely used for encapsulation material and molding material for electronic elements and electric and electronic components.

In particular, this silicone rubber, when compounded with filler or pigment, is so good in flame retardation that it is widely used for encapsulation of flyback transformers of televisions and molding materials for voltage multipliers of televisions.

This kind of addition-type silicone rubber, has the shortcoming that it is poor in adhesive properties with plastic and other materials; therefore, its use is limited. In order to solve this problem, various primer compositions were devised. But it is extremely difficult to provide satisfactory adhesive property for both plastics and metals, and thereby applications for electric and electronic components using a variety of materials are limited.

There was discovered a primer composition which provides addition-type silicone rubbers with excellent adhesiveness to many kinds of plastics and metals by blending tetetraorganotitanate possessing an organic group with two to eight carbon atoms or its polymerized compound, an epoxy-group-containing organosilicon compound, an unsaturated-bond-containing organosilicon compound, platinum or its compounds, an organic polymer soluble in an organic solvent, and one or a combination of more than two kinds of organic solvents. Such a composition is disclosed in Japanese Patent Application 1978, No. 107757—referring to Patent announcement 1977-32030.

That invention opened the way for using addition-type silicone as an encapsulation and molding material for electric and electronic components. However, one of the problems with such primer composition was it had poor adhesive property with polyvinylchloride type resins, particularly with semi-hard polyvinylchloride coated electric wire used as lead wire. Thus, its use with some electric and electronic components is limited.

Accordingly, there is presented by the present composition a primer composition that provides a satisfactory adhesive property of addition-type silicone rubber with polyvinyl chloride type resin without detracting the adhesive properties with other plastics and metals.

SUMMARY OF THE INVENTION

This invention provides the compositions consisting of (A) epoxy-group-containing silane expressed by the general formula, $R^1_aR^2_b Si(OR^3)_{4-(a+b)}$, where $R^1$ is an epoxy functional hydrocarbon group, $R^2$ and $R^3$ are both alkyl groups; (a has a value of 1 or 2, and b has a value of 0 or 1); (B) organosilicon compound possessing a carbon aliphatic unsaturated linkage; (C) vinyl acetate type polymer; (D) platinum or a platinum compound; and (E) ester-type organic solvent.

DESCRIPTION OF THE PREFERRED EMBODIMENT

Ingredient (A) in this invention can be expressed as a general formula, $R^1_aR^2_bSi(OR^3)_{4-(a+b)}$, which is an epoxy-group-containing silane, e.g. $\gamma$-glycidoxypropyltrimethoxysilane, $\gamma$-glycidoxypropyltriethoxysilane, $\gamma$-glycidoxypropyl (methyl) diethoxysilane, and $\beta$-(3,4-epoxycyclohexyl) ethyltrimethoxysilane. The amount of epoxy-group-containing silane in the composition is not specifically defined. However, it is preferable within the range from 0.5 to 50 weight percent of the total amount of ingredients from (A) to (D).

The (B) ingredient in this invention is an organosilicon compound including a carbon-carbon aliphatic unsaturated linkage, in which, compounds with a silicon-bonded vinyl group, allyl group, and methacryloxypropyl group are desireable because of their easy availability and simple handling. Examples of these alkenyl-containing compounds are: silanes such as vinyltriethoxysilane, vinyltri($\gamma$-methoxyethoxy) silane, vinyltriacetoxysilane, methylvinyldimethoxysilane, allyltrimethoxysilane, allytriethoxysilane, methylallyldimethoxy silane and $\gamma$-methacryloxypropyltrimethoxysilane; siloxanes such as 1,1,3,3,-tetramethyl-1, 3-divinyldisiloxane and tetramethyltetravinylcyclotetrasiloxane. The amount of organosilicon compound described above is not specifically defined but 0.1 to 50 weight percent for the total amount of the ingredients from (A) to (D) is preferable.

Ingredient (C) in this invention is a polyvinylacetate type polymer. Examples are: Polyvinylacetate vinylacetate-vinylchloride copolymer. These can be used independently or in combination of more than two polymers. The amount of ingredient (C) is not specified but 0.1 to 50 weight percent of the total amount of the ingredients from (A) to (D).

Ingredient (D) in this invention is platinum or its compound. For example, it may be single platinum; or platinum adsorbed in aluminum oxide, carbon black, etc.

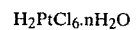H$_2$PtCl$_6$.nH$_2$O

NaHPtCl$_6$.nH$_2$O

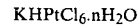KHPtCl$_6$.nH$_2$O

Na$_2$PtCl$_6$.nH$_2$O

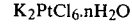K$_2$PtCl$_6$.nH$_2$O

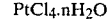PtCl$_4$.nH$_2$O

PtCl$_2$

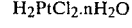H$_2$PtCl$_2$.nH$_2$O or complexes of these compounds with unsaturated-linkage-containing compounds or alcohol. Such compounds may be used either in their original states or dissolved in alcohol, ether, etc. The amount of platinum or platinum compound is not specified but 0.001 to 1 weight percent of the total amount of ingredients from (A) to (D) is preferred.

Ingredient (E) in this invention is an ester group hydrocarbon solvent which can be used independently or in a mixture of more than two kinds of solvents. Examples of ester-group solvents are butyl formate, methyl acetate, ethyl acetate, isopropyl acetate, butyl acetate, amyl acetate, methyl butyrate, etc. The amounts of these ester type solvents are not specifically defined. However, the total amount of the ingredients of (A) to (D) is preferred to be 5 to 40 weight percent in the primer. When it is below 5 weight percent, wetting to substrates becomes insufficient depending on the nature of the substrates, and thereby uniform adhesive strength is sometimes unattainable. When it is above 40 weight percent, a film layer becomes so thick on the adhering surface that adhesive strength becomes poor and also it becomes difficult to treat in and around the substrate of complicated configuration. These ester solvents are necessary to dissolve ingredient (C) in a primer and to improve wetting of the surface of substrates such as vinylchloride wire. There is no problem if such solvents as methyl alcohol, ethyl alcohol, etc. are used together with ingredient (E).

The ingredients in this invention are sensitive to water; therefore it is necessary for them to be stored and combined without the presence of water.

The following procedures are popular when using the compositions in this invention for coupling of addition-type silicone rubber:

To prepare a primer composition consisting of the ingredients from (A) to (E).

To apply the primer composition by means of spray, brush, and immersion.

To dry by air or dry by warm air blown to remove the solvent and to form a film.

To apply addition-type silicone rubber on the abovementioned film by means of molding, injection molding, immersion, etc.

To cure silicone rubber at room temperature or up to 200° C.

Thus, an adhesive layer can be formed between the substrate and silicone rubber.

The possible substrates are: inorganics such as glass, ferrite, ceramics; metals such as aluminum, dulalmin, iron, stainless steel, brass, etc.; plastics such as polyphenyleneoxide, polyester resin, phenol resin, epoxy resin, polybutadieneterephthalate, nylon, A.B.S., etc. However, the characteristic of the composition in this invention is to provide an excellent adhesive property with polyvinylchloride, especially with semi-hard polyvinylchloride.

The composition in this invention enables addition-type silicone compositions to adhere to the aforementioned various substrates, and particularly to polyvinylchloride. These addition-type silicone compositions comprise of a vinyl containing organopolysiloxane having a viscosity varying from 500 to 30,000,000 centipoise at 25° C. where the organo groups are selected from the class consisting of monovalent hydrocarbon radicals and halogenated monovalent hydrocarbon radicals, a silicon-bonded-hydrogen containing polysiloxane having a viscosity varying from 5 to 5,000 centipoise at 25° C. where the organo groups other than hydrogen are selected from monovalent hydrocarbon radicals and halogenated hydrocarbon radicals and a platinum catalyst. Such compositions may contain other ingredients.

Accordingly, the compositions of this invention extend the application of addition-type silicone rubber to electric and electronic components such as flyback transformers, voltage multipliers of TV. Especially, it enables silicone rubber to be used as encapsulation or injection molding materials for the abovementioned electric and electronic components in which semi-hard polyvinylchloride is used as a lead wire.

This invention will be explained using four practical examples, where parts denote parts by weight.

EXAMPLE 1

The mixing ingredients shown in Table 1 are mixed homogenously and dissolved. Thus primer compositions are obtained as shown.

TABLE 1

| | Primer Composition | | | | | |
|---|---|---|---|---|---|---|
| | This Invention | Comparative Examples | | | | |
| Ingredients | 11 Parts | 12 Parts | 13 Parts | 14 Parts | 15 Parts | 16 Parts |
| γ-glycydoxypropyl-trimethoxysilane | 15 | — | 15 | 15 | 15 | 15 |
| Vinyl-triethoxysilane | 8 | 15 | — | 8 | 8 | 8 |
| Geon 400 × 110A *1 | 8 | 8 | 8 | — | 8 | — |
| Chloroplatinic acid isopropylalcohol (Pt 1%) solution | 0.1 | 0.1 | 0.1 | 0.1 | — | 0.1 |
| Ethylacetate | 160 | 160 | 160 | 160 | 160 | — |
| Tetrabutyltitanate | — | — | — | — | — | 8 |
| Araldite GY250 *2 | — | — | — | — | — | 10 |
| Methylalcohol | — | — | — | — | — | 100 |
| Toluene | — | — | — | — | — | 60 |

Remarks:
*1 Vinylchloride-vinylacetate copolymer. The average degree of copolymerization is 400. (it is a trademark of Geon, Japan Co., Ltd.)
*2 Bisphenol A-epichlorohydrine type epoxy resin. (It is a trademark of Ciba Co., Ltd.)

The obtained primer composition was applied by brush on a variety of substrates after washing with 1,1,2-trifluoro-1,2,2-trichloroethane. These substrates were dried for one hour by air and thus a primer film was formed. Then addition-type silicone rubber T.S.E. 3422RTV (trademark of Toshiba Silicone Co., Ltd.) was applied and cured for one hour at 100° C. The results of the test show whether or not the adhesive property exists. We obtained the following adhesion data as shown in Table 2. From the results of Table 2 we can prove the superior properties of the primer composition of this invention.

TABLE 2

| | Primer Compositions | | | | | |
|---|---|---|---|---|---|---|
| | This Invention | Comparative Examples | | | | |
| Substrates | 11 | 12 | 13 | 14 | 15 | 16 |
| Semi-hard vinylchloride | o | x | x | x | Δ | x |
| Aluminum | o | Δ | Δ | x | Δ | x |
| Polyester resin | o | x | Δ | x | Δ | o |
| Phenol resin | o | x | Δ | x | Δ | o |
| Epoxy resin | o | Δ | Δ | x | Δ | o | o = good adhesion (cohesion failure: 100%)
x = no adhesion
Δ = some adhesion

EXAMPLE 2

We obtained a primer composition by mixing and dissolving equal portions of the following:

TABLE 3

| | Primer Components | | | | |
|---|---|---|---|---|---|
| | This Invention | Comparative Examples | | | |
| Ingredients | 21 | 22 | 23 | 24 | 25 |
| β-(3,4-epoxycyclohexyl ethylmethoxysilane | 10 | 10 | 15 | 10 | 10 |
| Vinyl-trimethoxysilane | 15 | — | — | — | — |
| Vinyltriacetoxysilane | — | 10 | — | — | — |
| Tetramethyltetravinylcyclotetrasiloxane | — | — | 10 | — | — |
| γ-methacryloxypropyltrimethoxysilane | — | — | — | 15 | — |
| Polyvinyl acetat *1 | 10 | 10 | 10 | 10 | 10 |
| Platinum Complex *2 | 0.1 | 0.1 | 0.2 | 0.3 | 0.2 |
| Ethyl acetate | 100 | 90 | 120 | 100 | 100 |

Remarks:
*1 The average degree of polymerization of 2,000.
*2 We obtained this complex chloroplatinum acid and alcohol and heating them. (platinum content is 0.5 weight percent).

These primer compositions and comparative composition of 16 in Table 2 are applied on the surface of two pieces of substrates with dimensions 50 mm × 20 mm after washing them with methylalcohol, and drying them by blowing air. Then addition-type silicone rubber T.S.E. 3402 RTV (brand name of Toshiba Silicone Co., Ltd.) was processed into 10 mm width and made a testing sample in a sandwich structure. This was heated for one hour at 100° C., which cured the silicone rubber layer. Thus, we measured shear adhesive strength, using a universal tensile strength tester with a tensile speed of 50 mm per minute to break-off point. The results are shown in Table 4.

TABLE 4

| | Coupling Strength in Unit Kg/Cm² | | | | | |
|---|---|---|---|---|---|---|
| | Primer Compositions | | | | | |
| | This Invention | | | | Comparative Examples | |
| Substrates | 21 | 22 | 23 | 24 | 25 | 16 |
| Hard polyvinyl chloride | 13 | 12 | 11 | 12 | 1 | 10 |
| Semi-hard polyvinyl chloride | 9 | 10 | 11 | 10 | 1 | 3 |
| Polybutylenterephthalate | 8 | 7 | 9 | 10 | 1 | 10 |

EXAMPLE 3

The ingredients shown in Table 5 were mixed homogeneously and dissolved and primer compositions were obtained.

TABLE 5

| | Primer Composition | | | |
|---|---|---|---|---|
| Ingredients | 31 | 32 | 33 | 34 |
| γ-glycidoxypropyl (methyl) diethoxysilane | 10 | 5 | 10 | 10 |
| Allytriethoxysilane | — | — | — | — |
| Vinyltri- (γ-methoxyethoxy) silane | 5 | 10 | — | — |
| γ-methyacryloxypropyl trimethoxysilane | 5 | 10 | — | — |
| Geon 400 × 150 *1 | 10 | 10 | 10 | 10 |
| Chloroplatinic Acid *2 | 0.2 | 0.3 | 0.2 | 0.3 |

TABLE 5-continued

| | Primer Composition | | | |
|---|---|---|---|---|
| Ingredients | 31 | 32 | 33 | 34 |
| Ethyl acetate | 100 | 120 | 100 | 100 |

REMARKS:
*1 Vinyl chloride-Vinyl Acetate Copolymer The average polymerization degree is 550. (Geon Japan, Co., Ltd.
*2 Isopropylalcohol solution (Pt 3%)

After applying and then drying these primer compositions on the surfaces of hard polyvinyl chloride, semi-hard polyvinyl chloride, polybutadienterephtalate, epoxy resin, 6-nylon, glass, ferrite, aluminum, and soft steel which were washed or pre-washed, addition-type silicone rubber T.S.E. 3431RTV (a brand name of Toshiba Silicone Co., Ltd.) is applied on the surfaces, heated at 100° C. for one hour, and cured. Adhesion of those samples thus obtained in the above treatment are tested. The result is that all of the cohesion breakdown rates are 100%.

EXAMPLE 4

10 parts of Geon 400×110A, 10 parts of γ-glycidoxypropyltrimethoxysilane, 10 parts of vinyltriethoxysilane, 0.2 parts of platinic acid-isopropylalcohol containing 5 weight percent of platinum and 120 parts of ethyl acetate are mixed and dissolved homogeneously. Thus primer composition is prepared, by which semi-hard vinyl chloride-covered electric wire with 5 mm diameter is processed. Addition-type RTV silicone rubber T.S.E. 3431RTV (a brand name of Toshiba Silicone Co., Ltd.) is applied and cured with 3-hour heating at 80° C., when good adhesion is discovered.

Shearing strength for drawing of the aforementioned electric wire is 10 kg/cm² and cohesion destruction rate is 100%.

Furthermore, the similar test is conducted using a primer composition of comparative example 16 of Example 1, the shearing strength for drawing is 3 kg/cm².

EXAMPLE 5

A composition containing 100 parts of butyl acetate instead of 100 parts of ethyl acetate in composition 21 of Example 2 is prepared.

An adhesion test is conducted for the above composition with 100 parts of butyl acetate as a primer between T.S.E. 3422RTV (a brand name of Toshiba Silicone Co., Ltd.) and semi-hard polyvinyl chloride-covered electric wire in a similar way to Example 1. As a result, the cohesion breakdown rate is 100% and the composition exhibited excellent adhesion.

We claim:

1. A primer composition for adhering silicone compositions to substrates comprising; (a) an epoxy functional silane of the formula $R^1_aR^2_bSi(OR^3)_{4-(a+b)}$ where $R^1$ represents an epoxy functional hydrocarbon radical, $R^2$ and $R^3$ are alkyl radicals, a has a value of 1 or 2, and b has a value of 0 to 1 and wherein said silane is present at a concentration of 0.5 to 50 weight percent of the total amount of ingredients of (a) to (d); (b) from 0.1 to 50 weight percent based upon the total of ingredients (a) to (d) of an alkenyl-containing organosilicon compound; (c) a vinyl acetate type organic polymer present in the amount of from 0.1 to 50 weight percent of the total amount of ingredients (a) to (d); (d) platinum or a platinum compound, present in the amount of from 0.001 to 1 weight percent of the total weight of ingredients (a) to (d); and (e) an ester-type organic solvent present in the amount of from 60 to 90 percent by weight of the total primer composition.

2. The primer composition of claim 1 wherein the epoxy functional silane compound is selected from the class consisting of γ-glycidoxypropyltrimethoxysilane, γ-glycidoxypropyltriethoxysilane, γ-glycidoxypropylmethyldiethoxysilane and β-(3,4-epoxycyclohexyl) ethyltrimethoxysilane.

3. The primer composition of claim 1 wherein the alkenyl-con-containing organosilicon compound is selected from the class consisting of vinyltriethoxysilane, vinyltriacetoxysilane, methylvinyldimethoxysilane, allytrimethoxysilane, methylallyldimethoxysilane and γ-methaacryloxypropyltrimethoxysilane.

4. The primer composition of claim 1 wherein the vinyl acetate type organic polymer is selected from the class consisting of vinyl polyacetate and a vinyl acetate-vinyl chloride copolymer.

5. The primer composition of claim 1 wherein the platinum or a platinum compound is selected from the class consisting of elemental platinum and a platinum complex.

6. The primer composition of claim 1 wherein the ester organic solvent is selected from the class consisting of formate, methyl acetate, ethyl acetate, isopropyl acetate, butyl acetate, amyl acetate and methyl butyrate.

7. A process for forming a primer composition useful for adhering SiH-olefin platinum catalyzed compositions to various substrates comprising mixing (a) an epoxy functional silane of the formula $R^1{}_aR^2{}_bSi(OR^3)_{4-(a+b)}$, where $R^1$ represents an epoxy functional hydrocarbon radical, $R^2$ and $R^3$ are alkyl radicals, a has a value of 1 to 2, and b has a value of 0 or 1 and wherein said silane is present at a concentration of 0.5 to 50 weight percent of the total amount of ingredients of (a) to (d); (b) from 0.1 to 50 weight percent based upon the total of ingredients (a) to (d) of an alkenyl-containing organosilicon compound; (c) a vinyl acetate type organic polymer present in the amount of from 0.1 to 50 weight percent of the total amount of ingredients (a) to (d); (d) platinum or a platinum compound, present in the amount of from 0.001 to 1 weight percent of the total weight of ingredients (a) to (d); and (e) an ester type organic solvent present in the amount of from 60 to 90 percent by weight of the total primer composition.

8. The process of claim 7 wherein the epoxy functional silane is selected from the class consisting of γ-glycidoxypropyltrimethyoxysilane, γ-glycidoxypropyltriethoxysilane, γ-glycidoxypropylmethyldiethoxysilane and β-(3,4-epoxycyclohexy) ethyltrimethoxysilane.

9. The process of claim 7 wherein the alkenyl-containing organosilicon compound is selected from the class consisting of vinyltriethoxysilane, vinyltriacetoxysilane, methylvinyldimethoxysilane, allyltrimethoxysilane, methylallyldimethoxy silane, and γ-methacryloxypropyltrimethoxysilane.

10. The process of claim 7 wherein the vinyl acetate type organic polymer is selected from the class consisting of vinyl polyacetate, vinyl acetate vinyl chloride copolymer and mixtures thereof.

11. The process of claim 7 wherein the platinum or a platinum compound is selected from the class consisting of elemental platinum and a platinum complex compound.

12. The process of claim 7 wherein the ester organic solvent is selected from the class consisting of propyl formate, methyl acetate, ethyl acetate, isopropyl acetate, butyl acetate, amyl acetate and methyl butyrate.

13. A laminate of a silicone composition to a substrate comprising (i) a substrate selected from the class consisting of metals, inorganics and plastics; (ii) a primer composition comprising (a) an epoxy functional silane of the formula $R^1{}_aR^2{}_bSi(OR^3)_{4-(a+b)}$ where $R^1$ represents an epoxy functional hydrocarbon radical, $R^2$ and $R^3$ are alkyl radicals, a has a value of 1 or 2, and b has a value of 0 or 1 and wherein said silane is present at a concentration of 0.5 to 50 weight percent of the total amount of ingredients of (a) to (d); (b) from 0.1 to 50 weight percent based upon the total of ingredients (a) to (d) of an alkenyl-containing organosilicon compound; (c) a vinyl acetate type organic polymer present in the amount of from 0.1 to 50 weight percent of the total amount of ingredients (a) to (d); (d) platinum or a platinum compound, present in the amount of from 0.001 to 1 weight percent of the total weight of ingredients (a) to (d); and (e) an ester type organic solvent present in the amount of from 60 to 90 percent by weight of the total primer composition, and (iii) an SiH-olefin platinum catalyzed composition having as its basic ingredients (1) a vinyl-containing polysiloxane polymer varying from 500 to 30,000,000 centipoise viscosity at 25° C., where the organo groups other than vinyl in the polysiloxane are selected from the class consisting of monovalent hydrocarbon radicals, and halogenated monovalent hydrocarbon radicals; (2) a hydrogen-containing polysiloxane compound having a viscosity varying from 5 to 5,000 centipoise at 25° C., where the organo groups in such polysiloxane are selected from the class consisting of monovalent hydrocarbon radicals and halogenated monovalent hydrocarbon radicals, and (3) a platinum catalyst.

14. The laminate of claim 13 wherein the epoxy functional silane is selected from the class consisting of γ-glycidoxypropyltrimethoxysilane, γ-glycidoxypropyltriethoxysilane, γ-glycidoxypropylmethoxydiethoxysilane and β-(3,4-epoxycyclohexy) ethyltrimethoxysilane.

15. The laminate of claim 13 wherein the alkenyl-containing organosilicon compound is selected from the class consisting of vinyltriethoxysilane, vinyltriacetoxysilane, methylvinyldimethoxysilane, allytrimethoxysilane, methylallyldimethoxysilane and γ-methacryloxypropyltrimethoxysilane.

16. The laminate of claim 13 wherein the vinyl acetate type polymer is selected from the class consisting of polyvinylacetate, vinylacetate-vinyl chloride copolymer and mixtures thereof.

17. The laminate of claim 13 wherein the platinum or platinum compound is selected from the class consisting of elemental platinum and a platinum complex compound.

18. The laminate of claim 13 wherein the ester organic solvent is selected from the class consisting of butyl formate, methyl acetate, ethyl acetate, isopropyl acetate, butyl acetate, amyl acetate and methyl butyrate.

19. A process for forming a laminate of a silicone composition with a substrate comprising (i) applying to a substrate selected from the class consisting of plastic substrates and metal substrates a primer composition having therein (a) an epoxy functional silane of the formula $R^1{}_aR^2{}_bSi(OR^3)_{4-(a+b)}$ where $R^1$ represents an epoxy functional hydrocarbon radical, $R^2$ and $R^3$ are alkyl radicals, a has a value of 1 or 2, and b has a value of 0 or 1 and wherein said silane is present at a concentration of 0.5 to 50 weight percent of the total amount of ingredients of (a) to (d); (b) from 0.1 to 50 weight percent based upon the total of ingredients (a) to (d) of an alkenyl-containing organosilicon compound; (c) a vinyl acetate type organic polymer present in the amount of from 0.1 to 50 weight percent of the total amount of ingredients (e) to (d); (d) platinum or a platinum compound, present in the amount of from 0.001 to 1 weight percent of the total weight of ingredients (a) to (d); and (e) an ester organic solvent present in the amount of from 60 to 90 percent by weight of the total primer composition; (ii) evaporating the solvent to form a primer film; (iii) applying over the primer film a silicone composition having therein (1) a vinyl-containing organopolysiloxane polymer having a viscosity varying from 500 to 30,000,000 centipoise at 25° C., where the organo groups other than vinyl are selected from monovalent hydrocarbon radicals and halogenated monovalent hydrocarbon radicals; (2) a hydrogen-containing polysiloxane polymer having a viscosity varying from 5 to 5,000 centipoise at 25° C., where the organo groups other than hydrogen in the polysiloxane are selected from the class consisting of monovalent hydrocarbon radicals and halogenated monovalent hydrocarbon radicals; and (3) a platinum catalyst; and (iv) heating the silicone composition so as to cure it to form a silicone elastomer.

* * * * *